(12) United States Patent
Tai

(10) Patent No.: US 6,448,737 B1
(45) Date of Patent: Sep. 10, 2002

(54) SEMICONDUCTOR SWITCH DEVICE FOR AN AC POWER SOURCE

(76) Inventor: Cheng-Yao Tai, No. 3, Lane 217, Sec. 2, Kuo-Chi Road, Taoyuan City (TW)

( * ) Notice: Subject to any disclaimer, the term of this patent is extended or adjusted under 35 U.S.C. 154(b) by 10 days.

(21) Appl. No.: 09/753,947

(22) Filed: Jan. 2, 2001

(51) Int. Cl.[7] ............................................... H02P 7/632
(52) U.S. Cl. ...................... 318/801; 363/159; 363/163
(58) Field of Search ................................. 318/722, 801; 363/106, 109, 123, 131, 133, 157, 159, 163, 177

(56) References Cited

U.S. PATENT DOCUMENTS

| | | | | |
|---|---|---|---|---|
| 3,678,358 A | * | 7/1972 | Kolatorowicz | 318/254 |
| 4,078,190 A | * | 3/1978 | Nash | |
| 4,482,853 A | * | 11/1984 | Bhavsar | 318/778 |
| 4,713,744 A | * | 12/1987 | Coston | 363/160 |
| 5,784,267 A | * | 7/1998 | Koenig et al. | 363/43 |
| 6,166,930 A | * | 12/2000 | Czerwinski | 363/44 |

* cited by examiner

Primary Examiner—Bentsu Ro
(74) Attorney, Agent, or Firm—Pro-Techtor International Services

(57) ABSTRACT

A semiconductor switch device for an AC power source comprises several first semiconductor elements and several second semiconductor elements connected in series with a plurality input AC sources of an AC power source, respectively. An end of each of the second semiconductor elements is electrically connected with each other. An output AC sources is formed between each first semiconductor element and its associated second semiconductor element, each output AC source being electrically connected to a load. A first reverse diode is connected in parallel with each first semiconductor element and a second reverse diode is connected in parallel with each second semiconductor element. A continuous closed circuit is formed by the load and one of the second semiconductor elements when the AC power source is cut off, thereby avoiding momentary over-voltage.

7 Claims, 7 Drawing Sheets

SEMICONDUCTOR SWITCH DEVICE FOR AN AC POWER SOURCE

BACKGROUND OF THE INVENTION

1. Field of the Invention

The present invention relates to a semiconductor switch device for an alternating current (AC) power source, and more particularly to a semiconductor switch device that may shut down an AC power source for a load, e.g., an electric motor.

2. Description of the Related Art

In an AC power output of a conventional electric motor equipped with a distributing disc and a frequency converter, the main switch must trip in a case that the output end has a short circuit or there is a malfunction in grounding. Currently, the main switch adopts fuseless switches, electromagnetic switches, or other breakers that operate mechanically and thus have a slow acting speed. Sparks are apt to occur and are thus dangerous and the longevity is relatively short. The slow acting speed of the switches tends to result in damage to the load when malfunctional current occurs in the load side. For example, a semiconductor type frequency converter does not allow over-current to exist more than 10 microseconds. However, it is impossible for current fuseless switches or breakers to reliably cut off the current within 10 microseconds. In addition, in an automated production systems (e.g. yarn coilers or conveying systems for steel-rolling apparatus), a frequency converter is in synchronous operation with tens of electric motors such that the whole production system stops once the frequency converter trips due to a short circuit of one of the electric motors or malfunction in grounding.

The switch circuits for soft starters, power factor controllers, and voltage-variable governors of traditional electric motors adopt reverse blocking triode thyristors wherein half of the waveforms is passed through a thyristor to delay activation for reducing the voltage. However, since the voltage waveforms are not sine waves, the power factor and the starting torque for the electric motor are low, the soft starting effect is thus poor. For example, the maximum starting current for an electric motor manufactured by Simens is 500% of the rated value, yet the maximum starting torque is only 25% which is only suitable for blowers and water pumps that have low starting torque. Application of the electric motor is thus severely limited such that the conventional soft starters cannot replace the starting devices of all kinds of electric motors.

SUMMARY OF THE INVENTION

A semiconductor switch device for an AC power source in accordance with the present invention comprises:

- a plurality of first semiconductor elements and a plurality of second semiconductor elements connected in series with a plurality input alternating current (AC) sources of an AC power source, respectively, an end of each of the second semiconductor elements being electrically connected with each other;
- a plurality of output AC sources each of which is formed between an associated said first semiconductor element and an associated said second semiconductor element, each said output AC source being electrically connected to a load;
- a plurality of first reverse diodes each of which is connected in parallel with an associated said first semiconductor element; and
- a plurality of second reverse diodes each of which is connected in parallel with an associated said second semiconductor element.

The AC power source can be cut off within 2 microseconds by means of supplying a control signal to the gates of the semiconductor elements. A continuous closed circuit is formed by the load and one of the second semiconductor elements when the AC power source is cut off, thereby avoiding momentary over-voltage. The AC source can be cut off at any time without the need to cut off after the voltage reaches zero, thereby providing a reliable protection immediately.

Each of the first semiconductor elements and the second semiconductor elements is an insulated gate bipolar transistor, metal-oxide semiconductor field-effect transistor, or giant transistor. Each of the first semiconductor elements and the second semiconductor elements includes a gate that equally divide a sine wave of the AC power source by a control signal of pulse width modulation, thereby modulating voltage to be outputted under cooperation with time control of pulse width modulation. The load may be a three-phase or single-phase electric motor.

The semiconductor switch device in accordance with the present invention, under cooperation with simple control functions, may replace conventional fuseless switches, electromagnetic switches, leakage breakers, thermal relays, and fuses. In addition, by means of cooperating with software and hardware, the semiconductor switch device in accordance with the present invention may acts as the soft starter, power factor controller, and voltage-variable governor of an electric motor, thereby providing precise and highly efficient operation.

In addition, electric arcs are not generated during operation of the semiconductor switch device in accordance with the present invention. The loss is small and the longevity is long. Only a voltage of 15 volts is sufficient to operate a current up to tens of thousands amperes, which may save the cost largely. Furthermore, by means of digital operation, operation of the semiconductor switch device in accordance with the present invention is simple, reliable, and highly efficient, and the semiconductor switch device can be communicated with a computer to proceed with centralized control.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
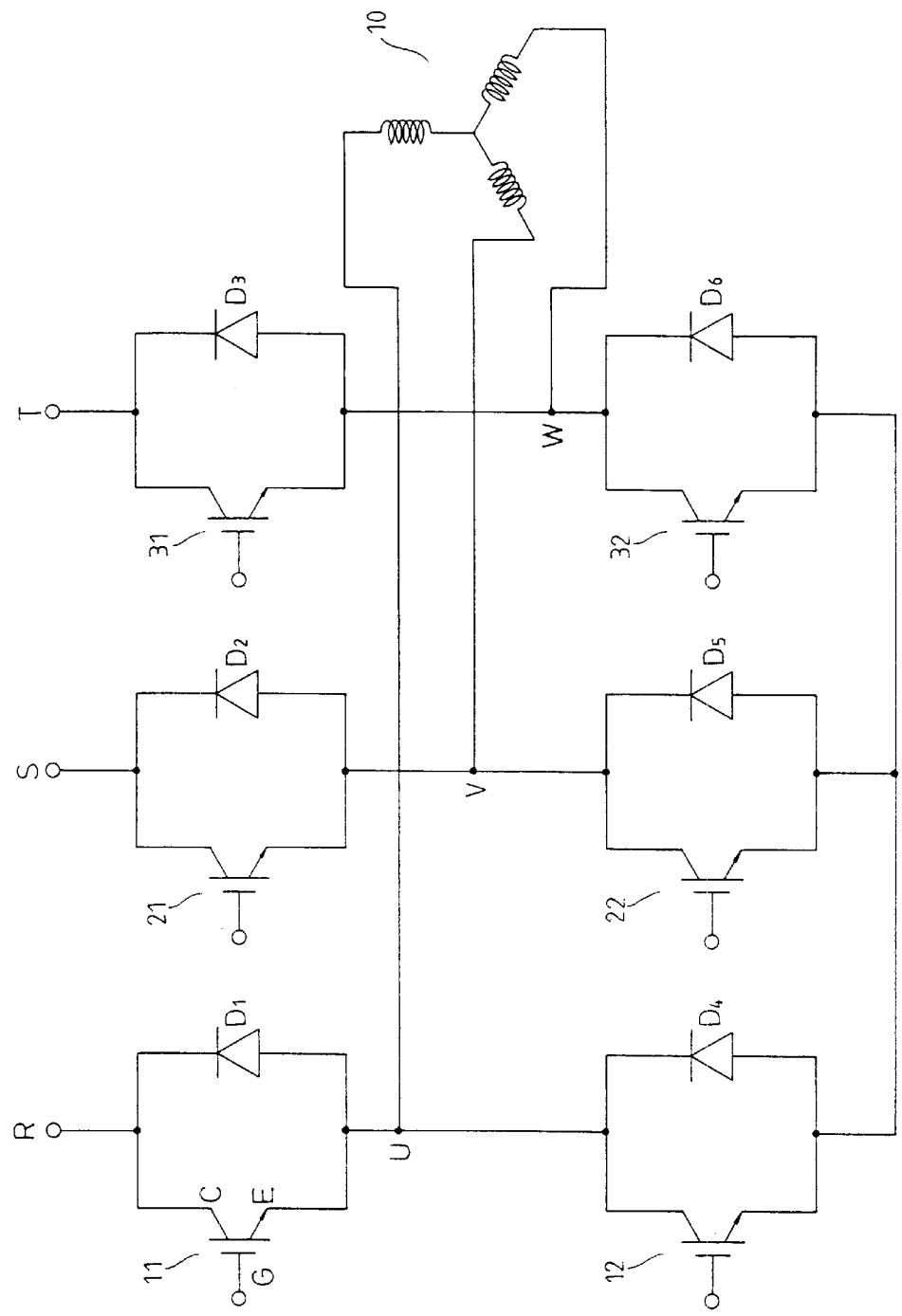
FIG. 1 is a schematic circuit diagram of a semiconductor switch device for an AC power source in accordance with the present invention.
Figure 2:
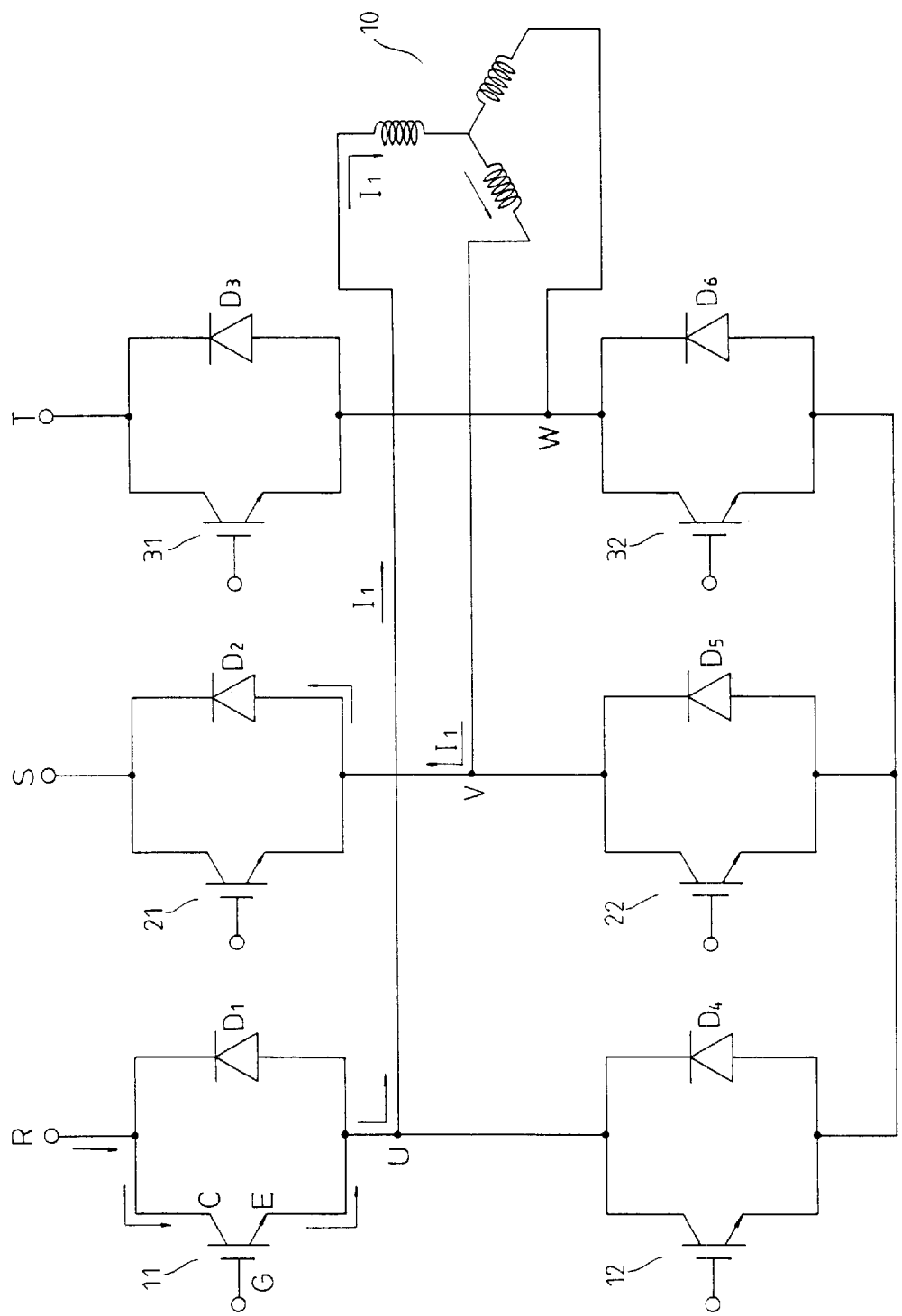
FIG. 2 is the schematic circuit diagram of FIG. 1, illustrating conduction from phase R to phase S.

Referring to FIG. 1, a semiconductor switch device in accordance with the present invention is provided to control on/off of an alternating current (AC) power source for a three-phase load, e.g., a three-phase electric motor. FIG. 1 depicts a load in the form of a three-phase electric motor 10.

As illustrated in FIG. 1, first semiconductor elements 11, 21, 31 and second semiconductor elements 12, 22, 32 are connected in series with R-phase, S-phase, and T-phase input AC sources, respectively. The other end of each of the second semiconductor elements 12, 22, and 32 are electrically connected with each other. In addition, an output AC source U, V, W is formed between each first semiconductor element 11, 21, 31 and its associated second semiconductor element 12, 22, 32. Each output AC source U, V, W is electrically connected to an associated coil of a three-phase electric motor 10. A reverse diode D1, D2, D3 is connected in parallel with each first semiconductor 11, 21, 31. A reverse diode D4, D5, D6 is connected in parallel with each second semiconductor 12, 22, 32. Each semiconductor element 11, 12, 21, 22, 31, 32 is an insulated gate bipolar transistor (IGBT), metal-oxide semiconductor field-effect transistor (MOSFET), or giant transistor (GTR).

Figure 3:
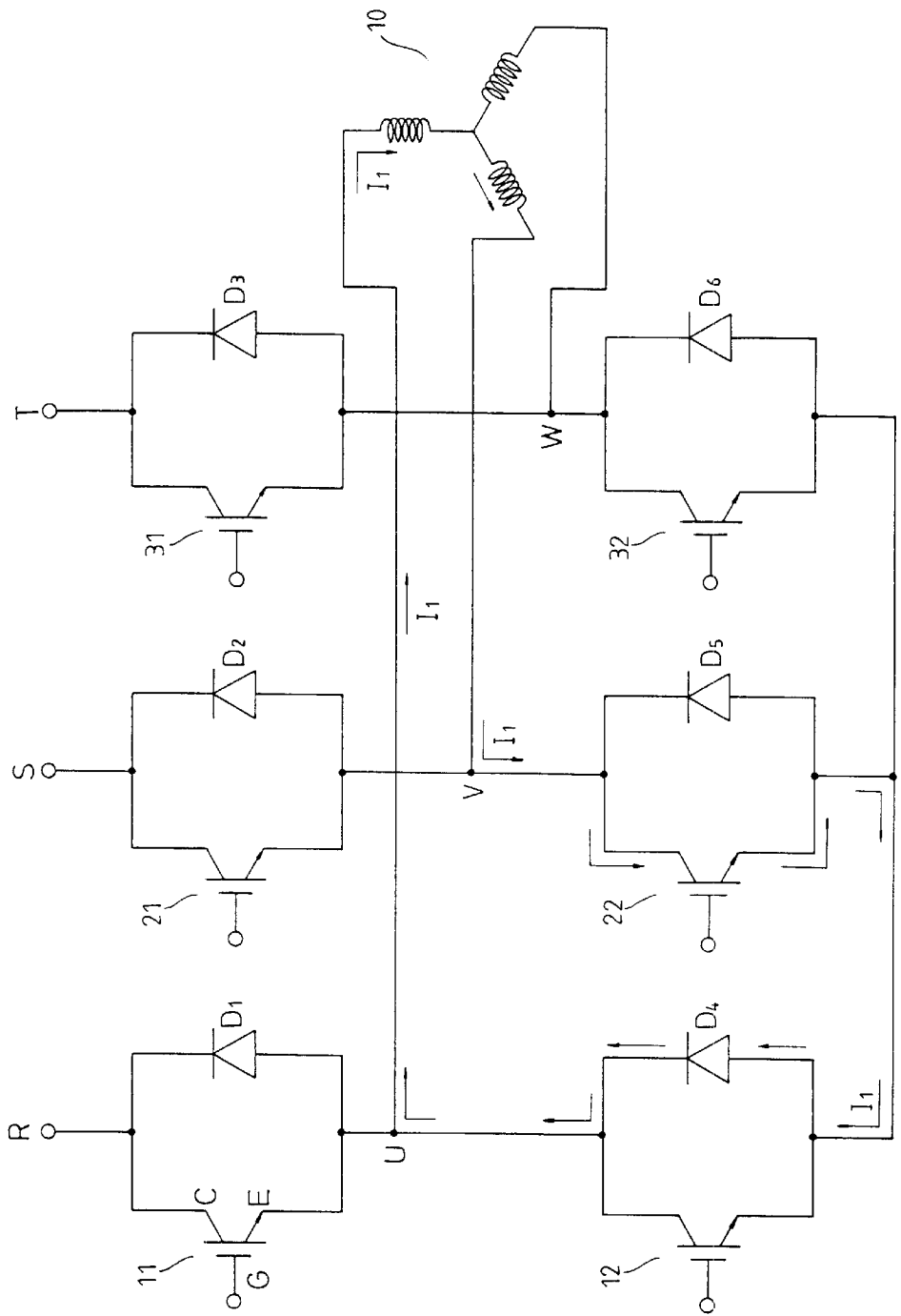
FIG. 3 illustrates cutting of AC power source in FIG. 2.
Figure 4:
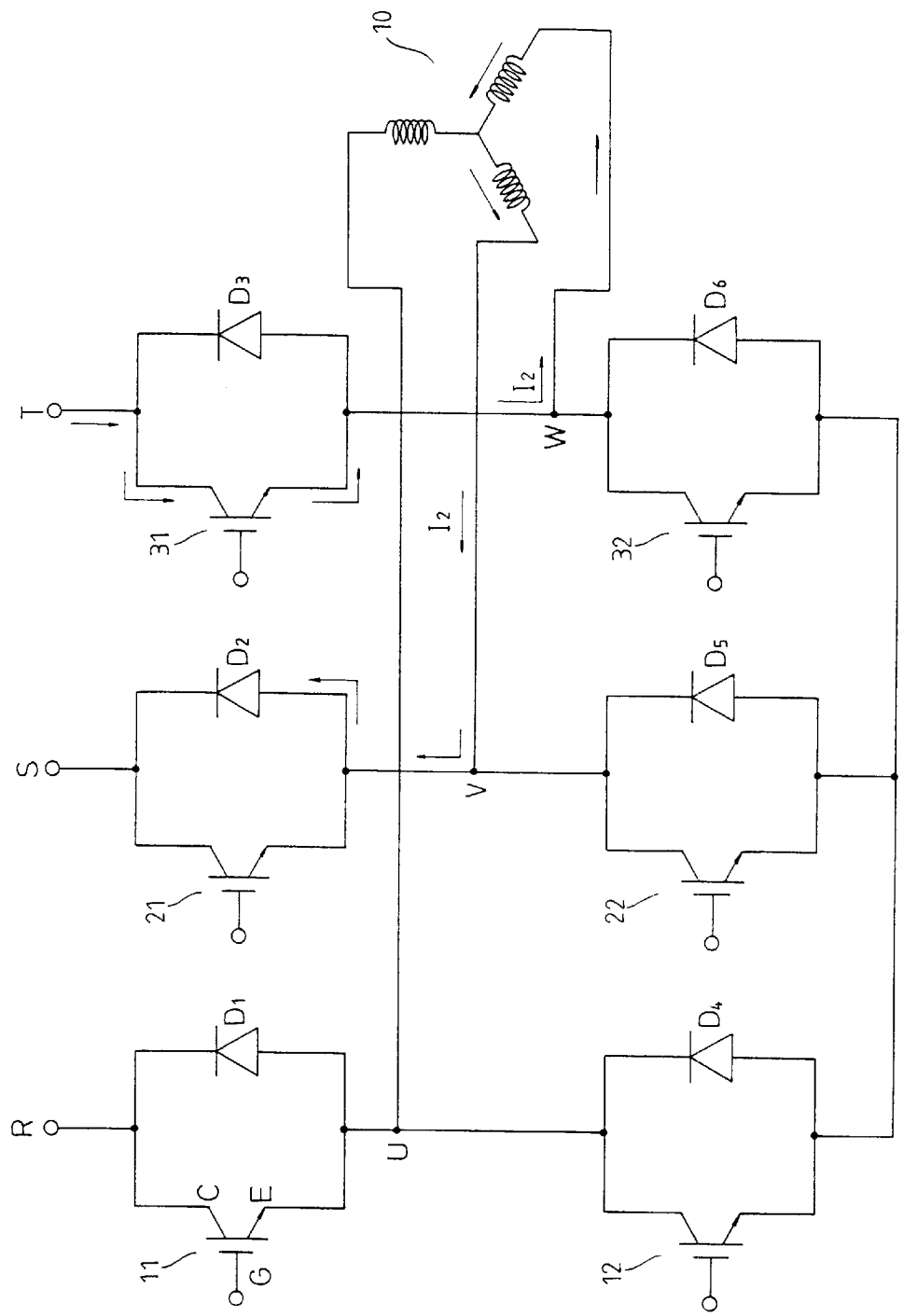
FIG. 4 is the schematic circuit diagram of FIG. 1, illustrating conduction from phase T to phase S.

During conduction between the R-phase input AC source and the S-phase input AC source, a gate control signal activates conduction of the first semiconductor element 11, and the second semiconductor elements 12 and 22 are cut off. The positive half wave of the R-phase input AC source passes through the first semiconductor element 11 to an associated coil of the three-phase electric motor 10. The current I1 then flows back and passes through the diode D2 of the S-phase input AC source. If the first semiconductor element 11 of the R-phase input AC source is cut off at any time and the second semiconductor elements 12 and 22 are conductive, as illustrated in FIG. 3, the current I1 of the associated coil of the three-phase electric motor 10 flows back to the coil via the second semiconductor element 22 of the S-phase input AC source and the diode D4 of the R-phase input AC source, thereby forming a continuous closed circuit to avoid momentary over-voltage. Thus, the AC source can be cut off at any time without the need to cut off after the voltage reaches zero, thereby providing a reliable protection immediately.

Figure 5:
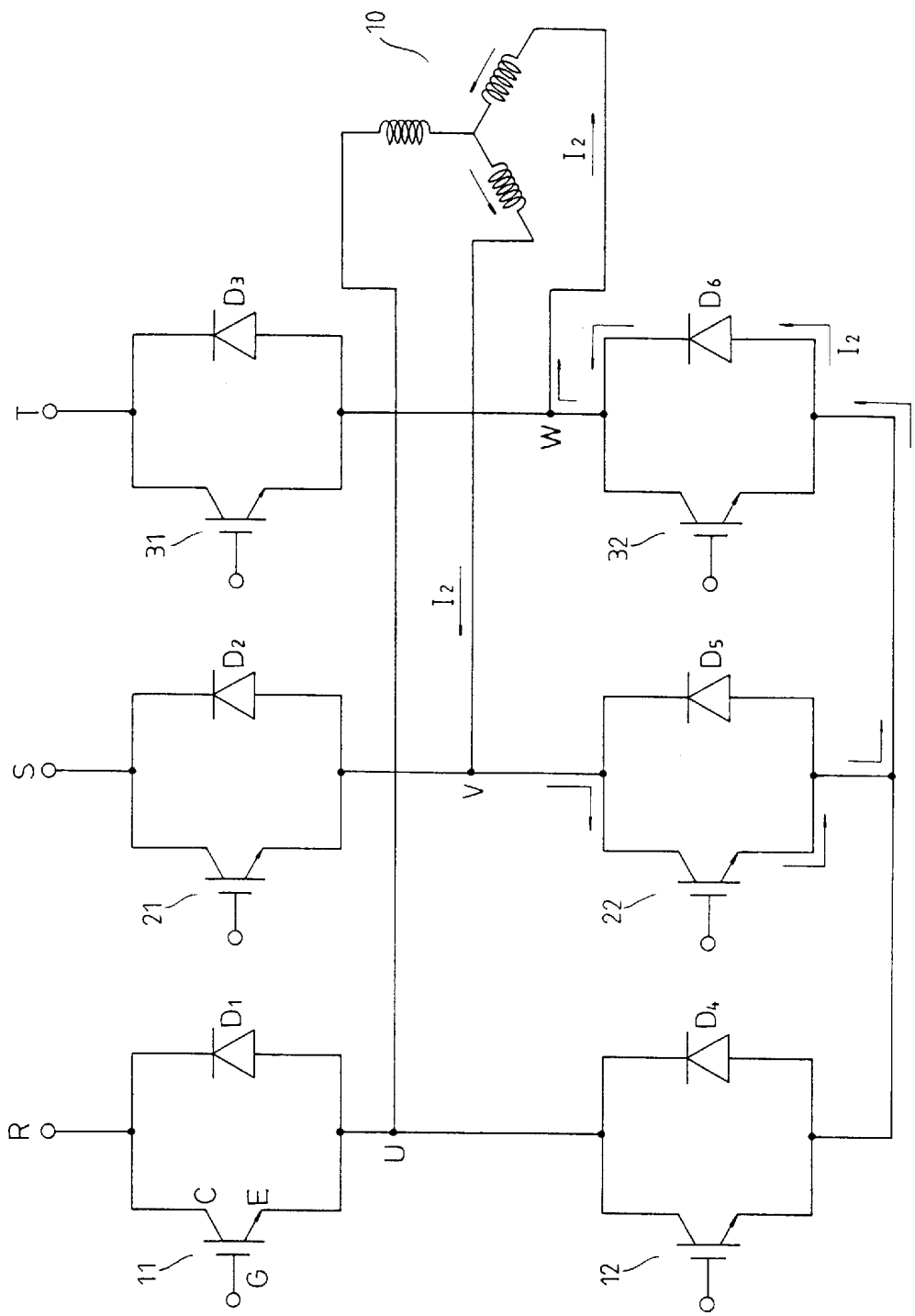
FIG. 5 illustrates cutting of AC power source in FIG. 4.

During conduction between the T-phase input AC source and the S-phase input AC source, the positive half wave of the T-phase input AC source passes through the first semiconductor element 31 to an associated coil of the three-phase electric motor 10. The current I2 then flows back and passes through the diode D2 of the S-phase input AC source. If the first semiconductor element 31 of the R-phase input AC source is cut off at any time, as illustrated in FIG. 5, the current I2 of the associated coil of the three-phase electric motor 10 flows back to the coil via the second semiconductor element 22 of the S-phase input AC source and the diode D6 of the T-phase input AC source.

Figure 6:
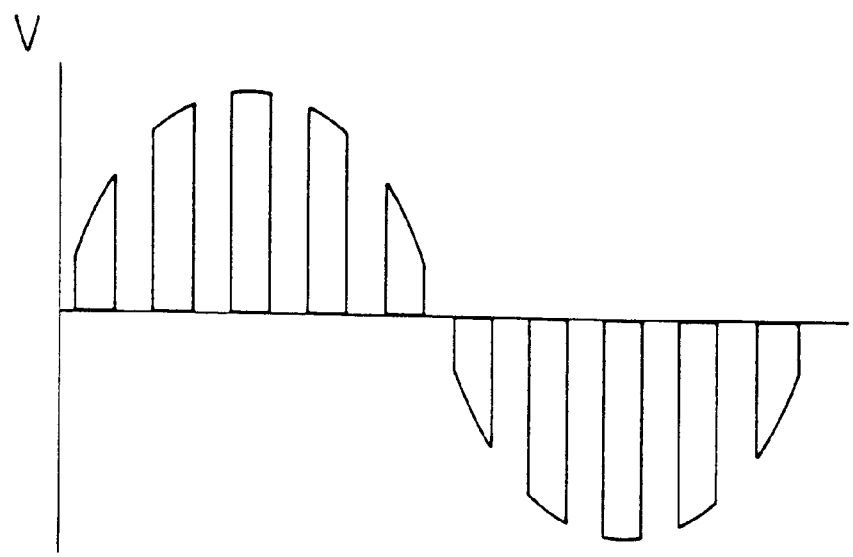
FIG. 6 illustrates waveforms of voltage and current outputted after pulse width modulation.
Figure 6:
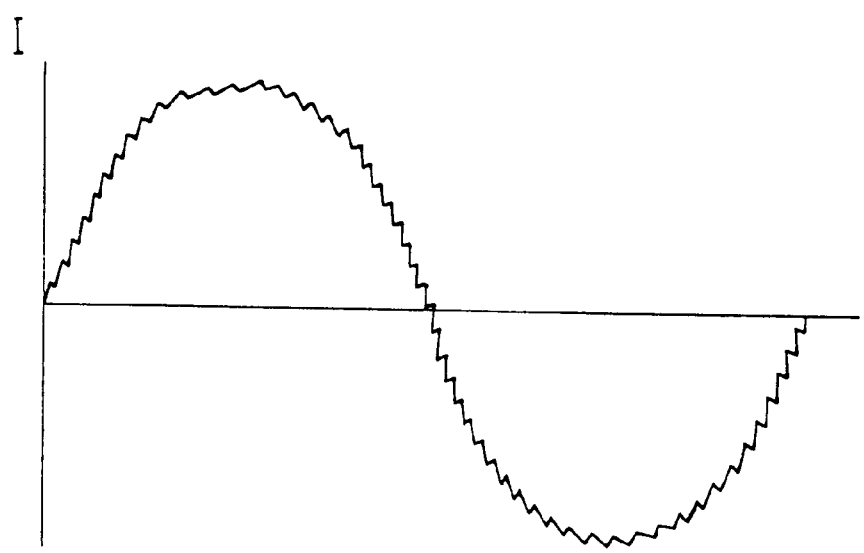

Alternatively, control signals by means of pulse width modulation may be inputted into the gate G between the first semiconductor element 11, 21, 31 and its associated second semiconductor element 12, 22, 32 to equally divide every sine wave of the three-phase AC source. By means of time control of pulse width modulation, a voltage waveform is obtained, as illustrated in FIG. 6, thereby achieving the purpose of modulating voltage. The outputted current waveform is nearly a sine wave. This improves the starting torque and the power factor of the electric motor.

Figure 7:
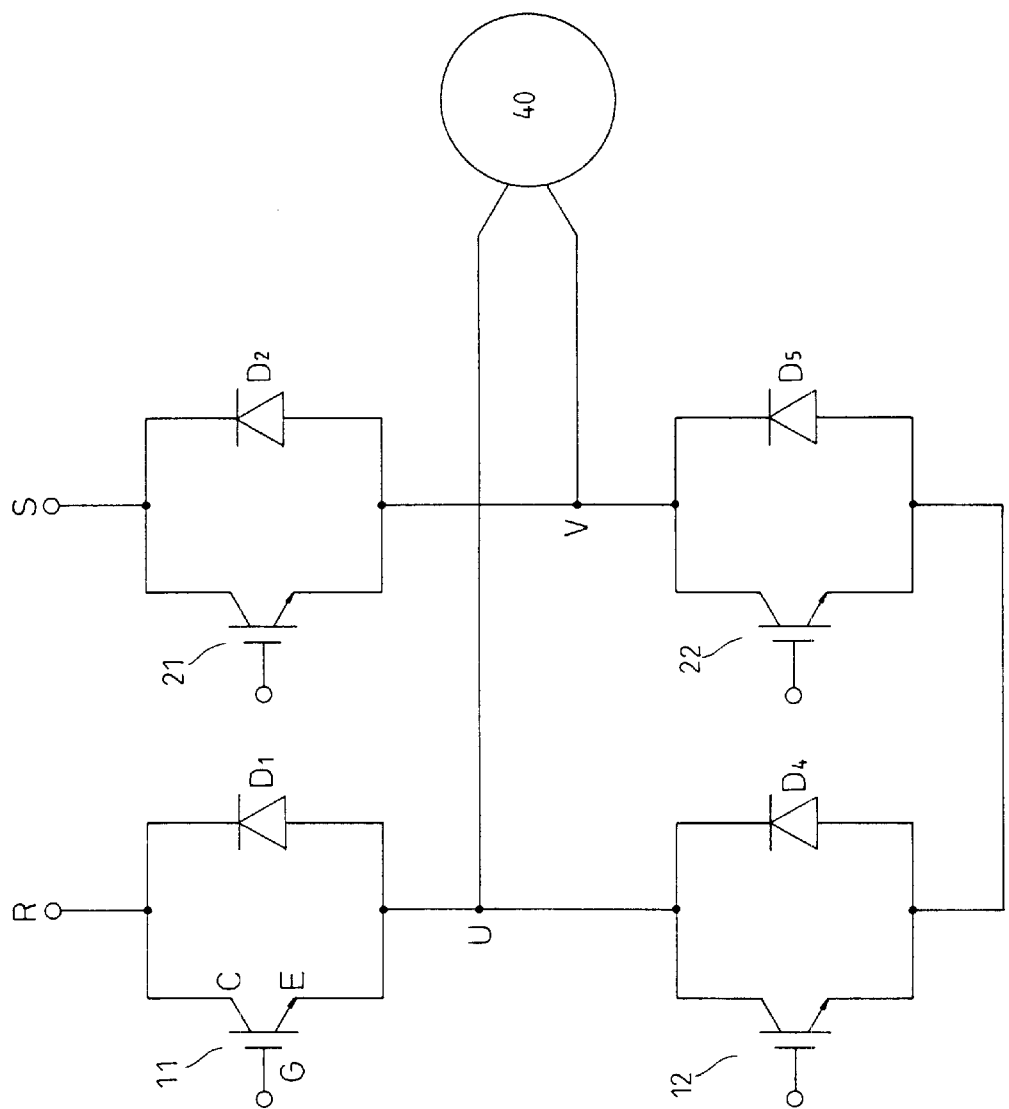
FIG. 7 is a schematic circuit diagram of a modified embodiment of the semiconductor switch device in accordance with the present invention.

FIG. 7 illustrates a circuit diagram for a single-direction electric motor 40. first semiconductor elements 11, 21 and second semiconductor elements 12, 22 are connected in series with R-phase and S-phase input AC sources, respectively. The other end of each of the second semiconductor elements 12 and 22 are electrically connected with each other. In addition, an output AC source U, V is formed between each first semiconductor element 11, 21 and its associated second semiconductor element 12, 22. Each output AC source U, V is electrically connected to a single-direction electric motor 40. A reverse diode D1, D2 is connected in parallel with each first semiconductor 11, 21. A reverse diode D4, D5 is connected in parallel with each second semiconductor 12, 22.

According to the above description, it is appreciated that the semiconductor switch device in accordance with the present invention may cut off the AC power source at any time within an extremely short period of time without the need to cut off after the voltage reaches zero, thereby providing a reliable protection immediately. It is suitable to isolation of power source, soft starting, power factor controllers, and voltage-variable controllers of electric motors. The overall shutting-down speed is quick without generating any electric arc. The longevity is long and the loss is small. It is simple, reliable, and highly efficient when cooperated with digital operation. In addition, it can be communicated with a computer to proceed with centralized control to precisely modulate the voltage by pulse width modulation. The outputted current is nearly a sine wave which improves the starting torque and the power factor of the electric motor.

Although the invention has been explained in relation to its preferred embodiment, it is to be understood that many other possible modifications and variations can be made without departing from the scope of the invention as hereinafter claimed.

What is claimed is:

1. A semiconductor switch device for an AC power source, comprising:
   a plurality of first semiconductor elements and a plurality of second semiconductor elements connected in series with a plurality input alternating current (AC) sources of an AC power source, respectively, an end of each of the second semiconductor elements being electrically connected with each other;
   a plurality of output AC sources each of which is formed between an associated said first semiconductor element and an associated said second semiconductor element, each said output AC source being electrically connected to a load;
   a plurality of first reverse diodes each of which is connected in parallel with an associated said first semiconductor element; and
   a plurality of second reverse diodes each of which is connected in parallel with an associated said second semiconductor element.

2. The semiconductor switch device as claimed in claim 1, wherein each of the first semiconductor elements and the second semiconductor elements is an insulated gate bipolar transistor.

3. The semiconductor switch device as claimed in claim 1, wherein each of the first semiconductor elements and the second semiconductor elements is a metal-oxide semiconductor field-effect transistor.

4. The semiconductor switch device as claimed in claim 1, wherein each of the first semiconductor elements and the second semiconductor elements is a giant transistor.

5. The semiconductor switch device as claimed in claim 1, wherein each of the first semiconductor elements and the second semiconductor elements includes a gate that equally divide a sine wave of the AC power source by a control signal of pulse width modulation, thereby modulating voltage to be outputted under cooperation with time control of pulse width modulation.

6. The semiconductor switch device as claimed in claim 1, wherein the load is a three-phase electric motor.

7. The semiconductor switch device as claimed in claim 1, wherein the load is a single-phase electric motor.

* * * * *